United States Patent
Green et al.

(10) Patent No.: US 7,640,564 B2
(45) Date of Patent: Dec. 29, 2009

(54) RECORDING RESOURCES INDICATORS

(75) Inventors: Dustin Green, Mountan View, CA (US); John Henry Grossman, IV, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 1403 days.

(21) Appl. No.: 10/427,797

(22) Filed: May 1, 2003

(65) Prior Publication Data

US 2004/0218905 A1 Nov. 4, 2004

(51) Int. Cl.
*G06F 3/00* (2006.01)
*G06F 13/00* (2006.01)
*H04N 5/445* (2006.01)

(52) U.S. Cl. .............................. 725/58; 725/37; 725/39; 386/83

(58) Field of Classification Search ..................... 725/39
See application file for complete search history.

(56) References Cited

U.S. PATENT DOCUMENTS

| | | | |
|---|---|---|---|
| 5,585,838 A | 12/1996 | Lawler et al. | |
| 5,731,844 A | 3/1998 | Rauch et al. | |
| 5,758,259 A | 5/1998 | Lawler | |
| 5,805,763 A | 9/1998 | Lawler et al. | |
| 5,815,145 A | 9/1998 | Matthews | |
| 5,907,323 A | 5/1999 | Lawler et al. | |
| 6,240,555 B1 | 5/2001 | Shoff et al. | |
| 6,493,873 B1* | 12/2002 | Williams | 725/78 |
| 2002/0059574 A1* | 5/2002 | Tudor et al. | 725/1 |
| 2002/0174433 A1* | 11/2002 | Baumgartner et al. | 725/58 |
| 2003/0115604 A1* | 6/2003 | Yamamura et al. | 725/55 |
| 2003/0115605 A1* | 6/2003 | Higuchi et al. | 725/58 |
| 2003/0154484 A1* | 8/2003 | Plourde et al. | 725/58 |
| 2003/0169783 A1* | 9/2003 | Coffin et al. | 370/536 |
| 2004/0013409 A1* | 1/2004 | Beach et al. | 386/83 |
| 2004/0055007 A1* | 3/2004 | Allport | 725/39 |
| 2006/0179462 A1* | 8/2006 | Willame et al. | 725/90 |

\* cited by examiner

*Primary Examiner*—John W Miller
*Assistant Examiner*—Robert Hance
(74) *Attorney, Agent, or Firm*—Lee & Hayes, PLLC

(57) ABSTRACT

In an implementation of recording resources indicators, recording resources can each be allocated to a different program that is scheduled to be recorded. A program guide application generates a program guide in which programs are associated with a program broadcast schedule that includes a time when each of the programs are scheduled for broadcast. A resource scheduler generates a recording resources indication for display within the program guide to indicate that the recording resources are fully-allocated for a time duration during which one or more of the programs are scheduled to be recorded.

55 Claims, 11 Drawing Sheets

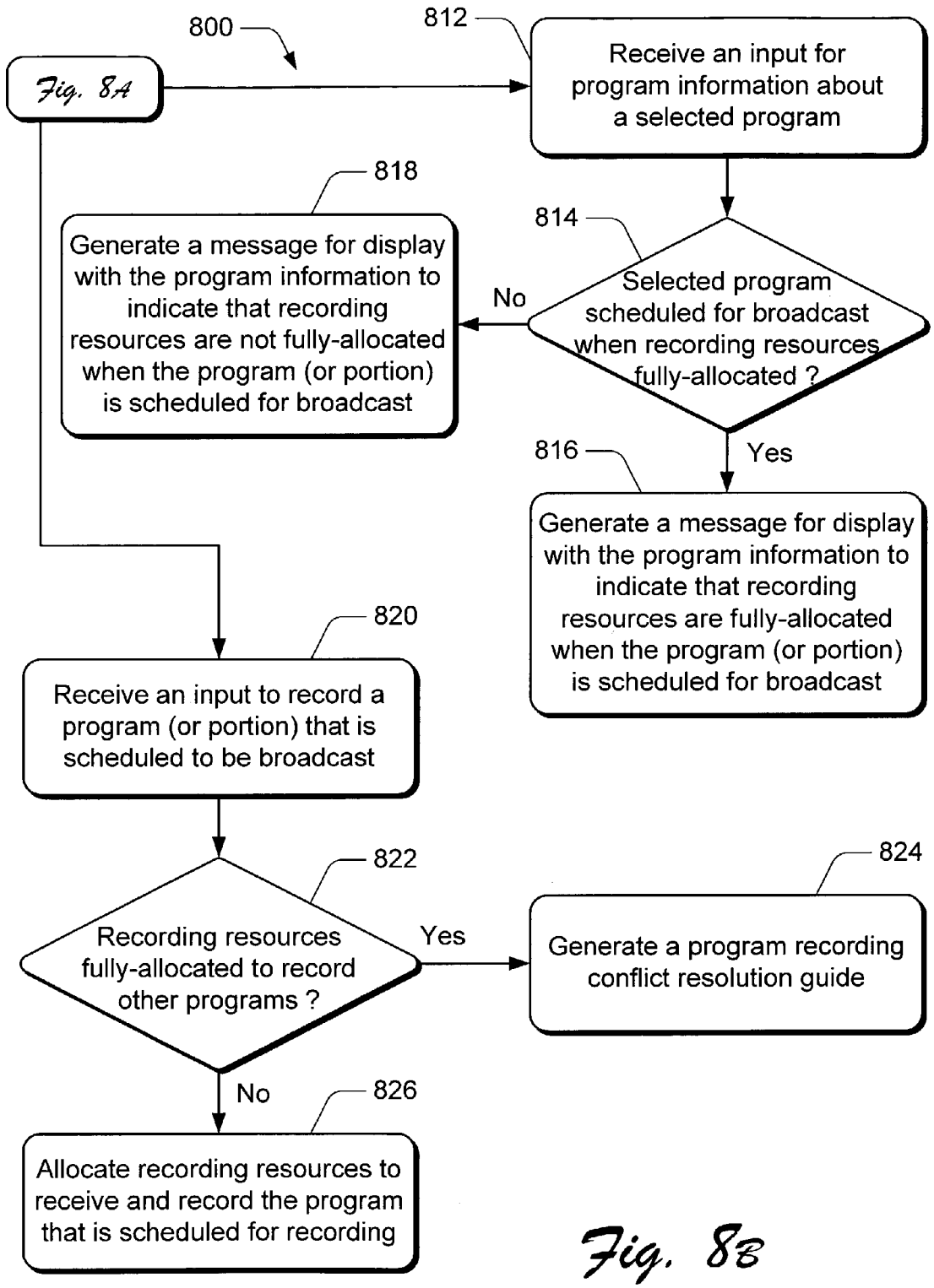

RECORDING RESOURCES INDICATORS

TECHNICAL FIELD

This invention relates to television-based program recording and, in particular, to recording resources indicators.

BACKGROUND

In a digital video recording environment, the number of programs that can be recorded at any one time is determined, or limited, by the number of tuners and/or by the available system resources of a recording device. For example, a digital video recorder with two such tuners can receive and record two programs simultaneously. Only after a user of the recording device requests or schedules three programs for recording at the same time will the recording device inform the user that the third program can not be recorded without one of the other two programs being canceled.

Typically, the user is prompted to resolve a conflict by either canceling their last recording request, or choosing to cancel a previously scheduled recording request. However, it can be difficult to determine the basis of a recording conflict when having to scan through an extensive list of available channels and programs to try and locate which programs have been previously scheduled for recording at the time indicated as being a conflict. Further, some systems will only identify to a user one other scheduled program recording as the conflict when the user schedules another program to be recorded. The user may then cancel the conflicting scheduled program recording only to be informed that a conflict still exists. This seemingly arbitrary program recording conflict resolution process further frustrates a user trying to determine the basis of scheduled program recording conflicts.

Accordingly, for program recording systems, there is a need to provide an indication of scheduled program recordings and recording resource availability so that program recording conflicts can be avoided. Additionally, there is a need to provide a user-friendly interface from which a user can quickly determine and resolve a program recording conflict.

SUMMARY

Recording resources indicators are described herein.

In an implementation, recording resources can each be allocated to a different program that is scheduled to be recorded. A program guide application generates a program guide in which programs are associated with a program broadcast schedule that includes a time when each of the programs are scheduled for broadcast. A resource scheduler generates a recording resources indication for display within the program guide to indicate that the recording resources are fully-allocated for a time duration during which one or more of the programs are scheduled to be recorded.

BRIEF DESCRIPTION OF THE DRAWINGS

The same numbers are used throughout the drawings to reference like features and components.

FIGS. 8A and 8B are a flow diagram that illustrates an exemplary method for recording resources indicators.

DETAILED DESCRIPTION

Figure 1:
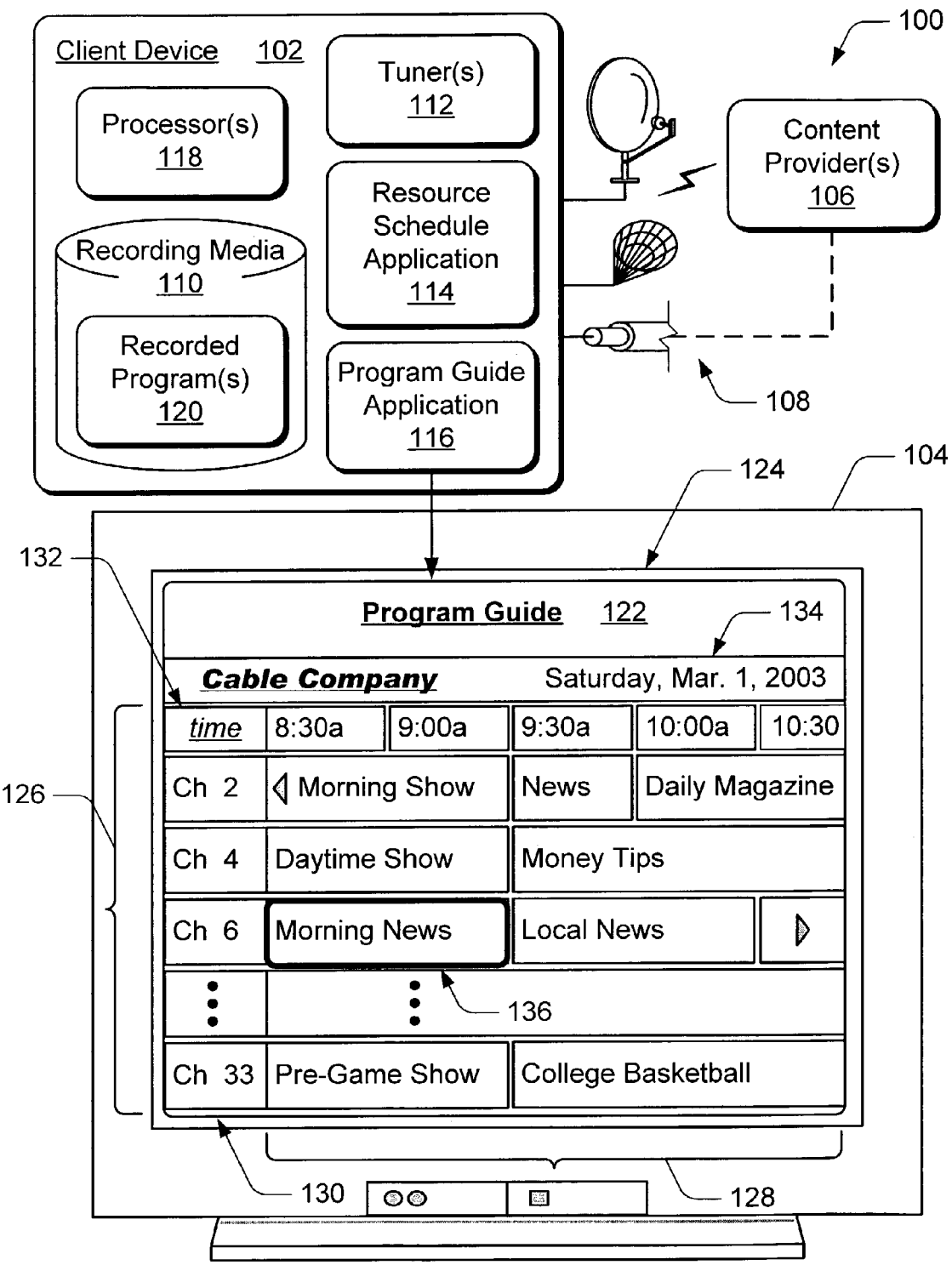
FIG. 1 illustrates various components of an exemplary recording resources indication system.

Recording resources indication systems and methods are described to provide an indication of when recording resources are fully-allocated to programs that are scheduled to be recorded so that a user of a recording device can avoid program recording conflicts. Further, a program recording conflict resolution guide is described to provide an interface from which a user can quickly determine and resolve program recording conflicts. A recording device, such as a digital video recorder implemented in a television-based system, utilizes the recording resources to receive and record broadcast and/or on-demand programs. Such recording resources include tuners which can each be independently tuned to a different program channel, available bandwidth over which the program channels are received, available space on a recording media to record the programs, and/or any other type of recording resource utilized by a recording device to receive and record the programs.

The recording resources indicators are generated for display within an electronic program guide to indicate a time duration during which the recording resources are fully-allocated to record programs that have been scheduled, or selected, to be recorded. The recording resources indicators include a resource allocation bar, a semi-transparent grid section, a list of the programs scheduled to be recorded during the time duration, and/or any combination thereof. Further, any type of program recording message can be generated for display within the electronic program guide or within a program information display to indicate to a user that the recording resources are fully-allocated for the time duration, or for a portion of the time duration, in which a particular program is scheduled to be broadcast. These indicators provide a user with visual indications that scheduling an additional program to be recorded during the time duration will initiate, or otherwise result in, a program recording conflict. This enables a user to anticipate recording resource conflicts so that the user can select programs to be recorded that are not subject to a program recording conflict.

The following discussion is directed to television-based entertainment and information systems, such as a two-way unicast network, interactive television networks, cable networks, satellite networks, and Web-enabled television networks. Client devices in such systems range from full-resource clients with substantial memory and processing resources, such as television-enabled personal computers and television recorders equipped with hard-disks, to low-resource clients with limited memory and/or processing resources, such as traditional set-top boxes that are also implemented to record broadcast programs. While aspects of the described systems and methods for recording resources indicators can be implemented in any number of television-based entertainment and information systems, and within any number and types of client devices, the systems and methods are described in the context of the following exemplary system architectures.

FIG. 1 illustrates various components of an exemplary recording resources indication system 100 to implement recording resources indicators. System 100 includes a client device 102, a display device 104, and one or more content providers 106 which may be a satellite operator, a network television operator, a cable operator, and the like. Content providers 106 control the distribution of such content as movies, programs, commercials, music, and similar audio, video, and/or image content. Client device 102 receives the content, such as broadcast programs or on-demand programs, via various transmission media 108, such as satellite transmission, radio frequency transmission, cable transmission, and/or via any number of other transmission media.

Client device 102 can receive broadcast program content and on-demand program content from a headend in a television-based content distribution system, for example, that provides the programs as well as program guide data to multiple client devices. Client device 104 can be implemented in any number of embodiments, such as a set-top box, a digital video recorder (DVR) and playback system, and as any other type of client device that may be implemented in a television-based entertainment and information system.

In this example, client device 102 includes a recording media 110, one or more tuners 112, a resource schedule application 114, a program guide application 116, and one or more processors 118 (e.g., any of microprocessors, controllers, and the like). Although not shown in this example, client device 102 may be implemented with any number and combination of differing components as further described below with reference to FIG. 9. The tuner(s) 112 can each be independently tuned to a different program channel to receive broadcast or on-demand programs which can be recorded and maintained with the recording media 110 as recorded programs 120. Recording media 110 can be implemented as any form of memory component, such as disk drive in a digital video recorder, for example.

As used herein, "programs" include news shows, sitcoms, comedies, movies, commercials, talk shows, sporting events, on-demand videos, and any other form of television-based entertainment and information. Further, "recorded programs" include any of the aforementioned "programs" that have been recorded and that are maintained with a memory component (e.g., recording media 110 in client device 102) as recorded programs 120, or that are maintained with a remote program data store (not shown). The "recorded programs" can also include any of the aforementioned "programs" that have been recorded and that are maintained at a broadcast center and/or at a headend that distributes the recorded programs to subscriber sites and client devices.

Resource schedule application 114 and program guide application 116 execute on processor(s) 118 and can be stored as computer-executable instructions in a non-volatile memory of client device 102. Program guide application 116 is implemented to generate a program guide 122 for display in a display region 124 of display device 104. Resource schedule application 114 is implemented to generate recording resources indicators for display within the program guide 122. The resource schedule application 114 is also referred to herein as the "resource scheduler", and the recording resources indicators are described below with reference to FIGS. 2-7. Although the resource schedule application 114 and the program guide application 116 are each illustrated and described as single applications, resource schedule application 114 and program guide application 116 can each be implemented as several component applications distributed to each perform one or more functions in a digital video recorder system and/or in any other client device in a television-based entertainment and information system. Further, although illustrated and described as two separate applications, the resource schedule application 114 and the program guide application 116 can be implemented together as a single application.

Program guide 122 includes a program broadcast schedule 126 which displays schedule information to indicate when a particular program 128 will be broadcast for viewing and on which program channel 130 the program will be broadcast or received. The program schedule information also associates each program 128 with a time display 132 that indicates a time of day when the program will be broadcast for viewing on a particular program channel 130. A particular program channel number 130 corresponds to a program time display 132 to indicate a program channel over which a program will be broadcast for viewing. For example, a "Local News" program will be broadcast for viewing at 9:30 a.m. on program channel six (6).

In this example, program guide 122 also includes a current date display 134. Other formats of a program guide that displays program schedule information may not utilize a grid organized on one axis by time and on another axis by program channel, as illustrated in FIG. 1. However, other program guide formats may be logically similar to display program channel and time correlations for program broadcasts. Further, although program guide 122 only illustrates a few program channels (e.g., 2, 4, 6, . . . 33), the program guide 122 can typically be scrolled up and/or down to display any number of program channel numbers and associated program listings.

Program guide 122 can include a selectable control 136 shown implemented as an on-screen focus. The selectable control 136 can be positioned to identify, or otherwise hi-lite, a program 128 and, when selected, initiate client device 102 tuning to the associated program channel to render the program for display. For example, selectable control 136 is positioned to identify a "Morning News" program scheduled to be broadcast on program channel six (6) starting at 8:30 a.m. A channel change selection will initiate displaying the selected program on display device 104 for viewing. Further, a program information selection will initiate displaying a program information display on display device 104 that includes a description of the selected program. A viewer can move selectable control 136 within the program broadcast schedule 126 and generate a channel change selection or a program information selection by manipulating an input device, such as a remote control for example.

Figure 2:
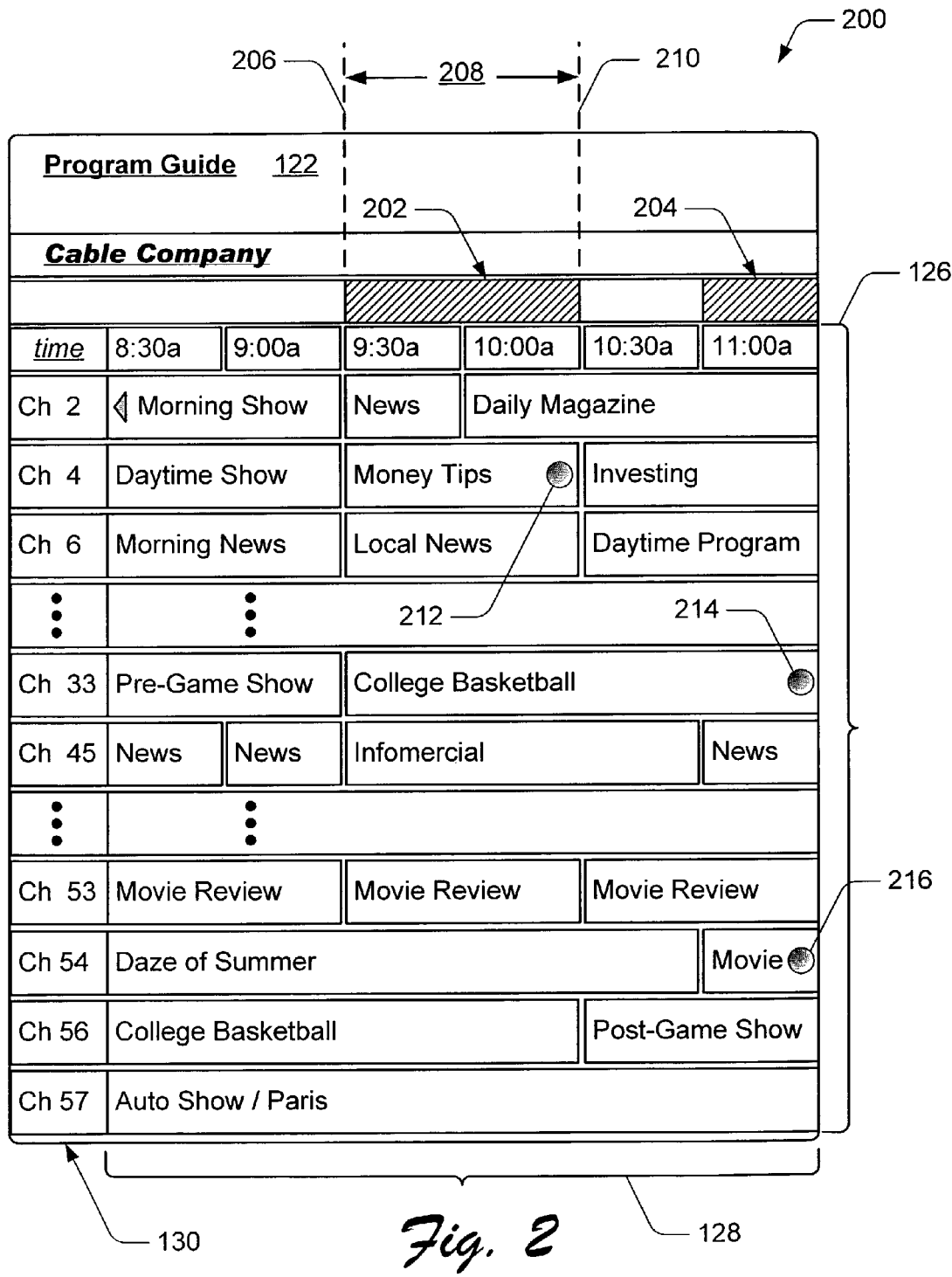
FIG. 2 illustrates a program guide with exemplary recording resources indicators.

FIG. 2 illustrates an exemplary implementation 200 of recording resources indicators 202 and 204 displayed within program guide 122. Recording resources of a client device include the tuners 112 (FIG. 1) which can each be independently tuned to a different program channel, available bandwidth over which client device 102 receives one or more program channels, available space on recording media 110 to record and maintain programs, and/or any other type of recording resource utilized by a client device to receive and record the programs.

In this example, each of the recording resources indicators 202 and 204 are a resource allocation bar. Resource allocation bar 202 indicates a beginning 206 of a time duration 208 and an end 210 of the time duration 208 during which the recording resources of client device 102 are fully-allocated to record one or more programs 128 as scheduled. For example, a program "Money Tips" on program channel four (4) starting at 9:30 a.m. is scheduled to be recorded as indicated by a program recording identifier 212. Additionally, a program "College Basketball" on program channel thirty-three (33) also starting at 9:30 a.m. is scheduled to be recorded as indicated by a program recording identifier 214.

For a two-tuner client device, the first tuner can be allocated to receive the first program "Money Tips" and the second tuner can be allocated to receive the second program "College Basketball" such that the two programs can be recorded as scheduled at the same time. Thus, for time duration 208 from 9:30 a.m. to 10:30 a.m., the recording resources (e.g., the two tuners of the example two-tuner client device) are fully-allocated in that another program can not be scheduled to be recorded during the time duration 208 without initiating a program recording conflict.

Similarly, resource allocation bar 204 indicates a time duration beginning at 11:00 a.m. during which a program "Movie" on program channel fifty-four (54) is scheduled to be recorded as indicated by a program recording identifier 216. The "College Basketball" program on channel thirty-three (33) starting at 9:30 a.m. overlaps with the scheduled recording of the "Movie" program beginning at 11:00 a.m. This overlap of scheduled program recordings is indicated by resource allocation bar 204. For the example two-tuner client device, the two tuners (e.g., the recording resources) are fully-allocated and another program can not be scheduled to be recorded during the time duration starting at 11:00 a.m. when the "Movie" program and the "College Basketball" program overlap without initiating a program recording conflict.

The resource allocation bars 202 and 204 can be generated by the resource schedule application 114 as solid, colored, and/or patterned bars along the top or bottom of the program guide 122. The recording resources indicators described 11 herein, such as the resource allocation bar 202, provide a visual indication that the recording resources of a client device are fully-allocated for a time duration to receive and record programs that have been scheduled, or otherwise designated, to be recorded.

Figure 3:
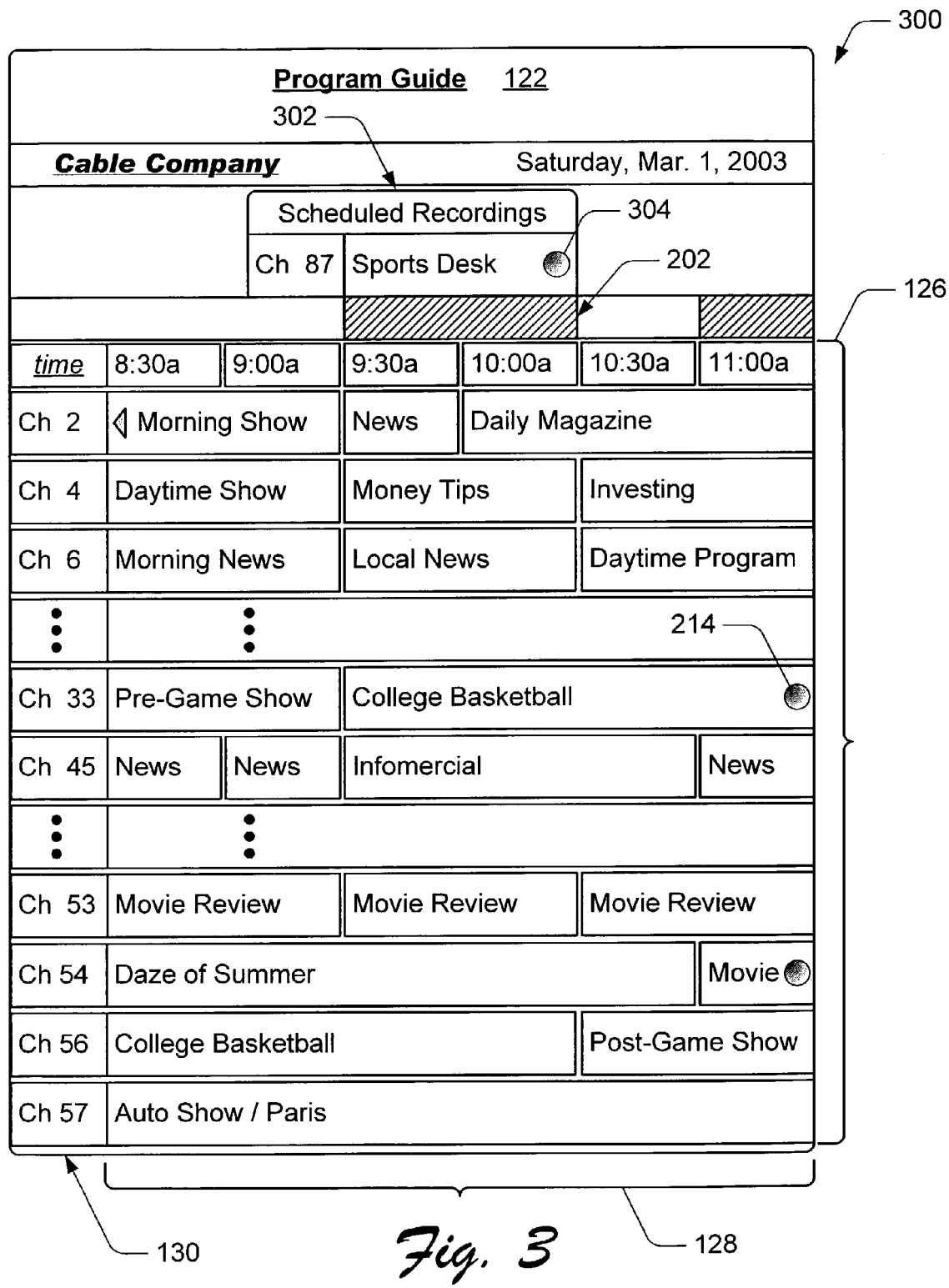
FIG. 3 illustrates a program guide with exemplary recording resources indicators.

FIG. 3 illustrates an exemplary implementation 300 of a recording resources indicator 302 displayed within program guide 122. In this example, the recording resources indicator 302 is a list of the programs scheduled to be recorded during a time duration from 9:30 a.m. to 10:30 a.m., and indicates that the recording resources of the client device are fully-allocated for the time duration. For example, a program "Sports Desk" on program channel eighty-seven (87) starting at 9:30 a.m. is scheduled to be recorded as indicated by a program recording identifier 304. Additionally, the program "College Basketball" on program channel thirty-three (33) also starting at 9:30 a.m. is scheduled to be recorded as indicated by the program recording identifier 214.

For a two-tuner client device, the first tuner can be allocated to receive the first program "Sports Desk" and the second tuner can be allocated to receive the second program "College Basketball" such that the two programs can be recorded as scheduled at the same time. Thus, for the time duration from 9:30 a.m. to 10:30 a.m., the recording resources (e.g., the two tuners of the example two-tuner client device) are fully-allocated and another program can not be scheduled to be recorded during the time duration without initiating a program recording conflict.

The list of programs 302 (e.g., the recording resources indicator) provides a visual indication that the recording resources of a client device are fully-allocated for a time duration to receive and record programs that have been scheduled, or otherwise designated, to be recorded. Further, the list of programs 302 displays the programs that are scheduled to be recorded together on one display so that a user does not have to scan through an extensive list of available channels and programs in the program guide 122 to locate other programs which may have been previously scheduled for recording during the time duration.

Although the list of programs 302 is illustrated as being displayed above the program broadcast schedule 126 within program guide 122, the list of programs 302 can be displayed anywhere within the program guide. Further, the list of programs 302 can be displayed with a resource allocation bar, such as with resource allocation bar 202, or the list of programs 302 can be displayed independently within program guide 122.

Figure 4:
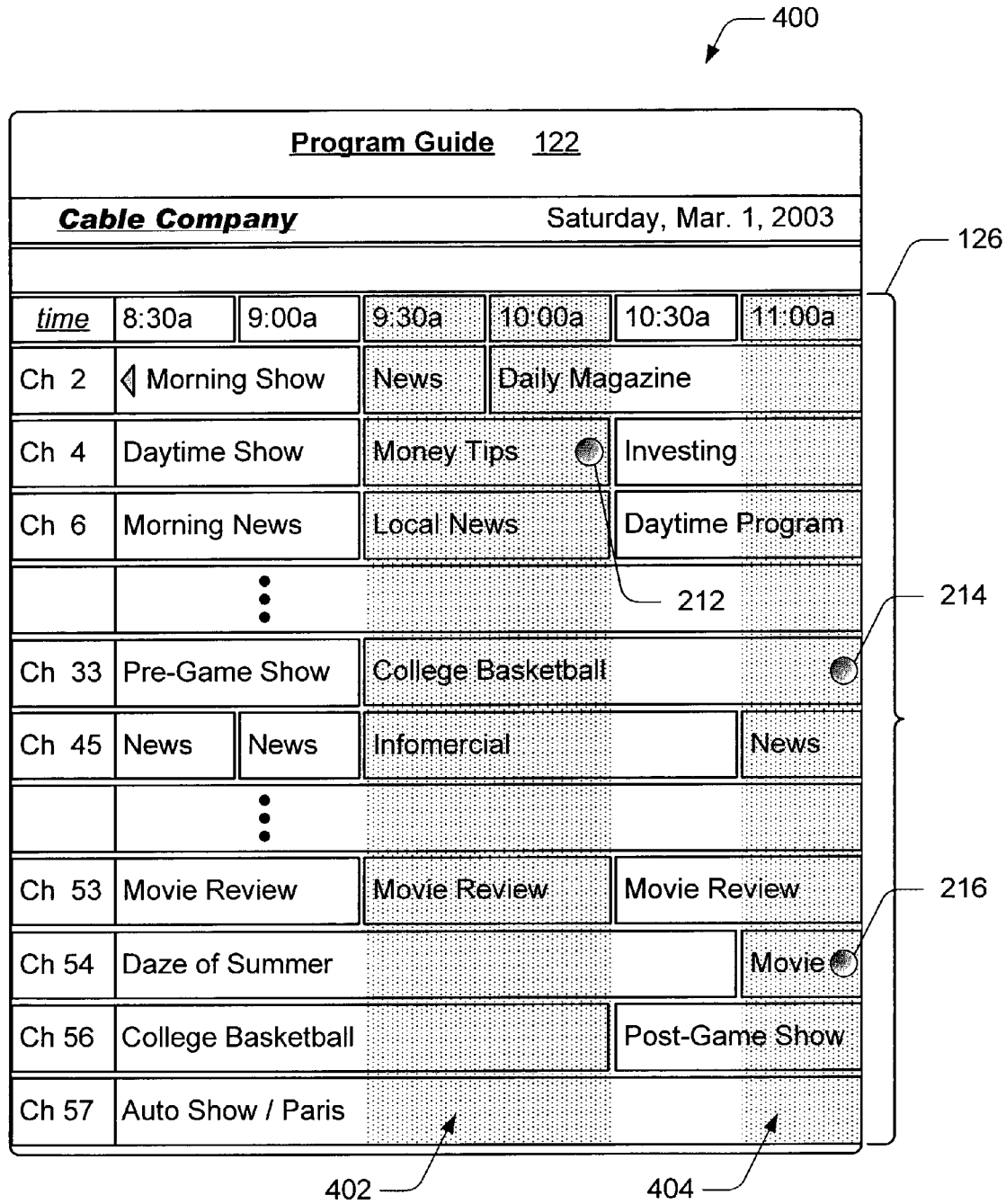
FIG. 4 illustrates a program guide with exemplary recording resources indicators.

FIG. 4 illustrates an exemplary implementation 400 of a recording resources indicators 402 and 404 displayed within program guide 122. In this example, each of the recording resources indicators 402 and 404 are generated by the resource schedule application 114 (FIG. 1) as a semi-transparent grid section that can be colored, shaded, patterned, or otherwise indicative of a time duration during which client device recording resources are fully-allocated to receive and record one or more programs.

For example, the program "Money Tips" on program channel four (4) starting at 9:30 a.m. is scheduled to be recorded as indicated by the program recording identifier 212. Additionally, the program "College Basketball" on program channel thirty-three (33) also starting at 9:30 a.m. is scheduled to be recorded as indicated by a program recording identifier 214. For a two-tuner client device, the first tuner can be allocated to receive the first program "Money Tips" and the second tuner can be allocated to receive the second program "College Basketball" such that the two programs can be recorded as scheduled at the same time. Thus, for the time duration from 9:30 a.m. to 10:30 a.m., the recording resources (e.g., the two tuners of the example two-tuner client device) are fully-allocated and another program can not be scheduled to be recorded without initiating a program recording conflict.

Similarly, the semi-transparent grid section 404 indicates a time duration beginning at 11:00 a.m. during which a program "Movie" on program channel fifty-four (54) starting at 11:00 a.m. is scheduled to be recorded as indicated by the program recording identifier 216. The "College Basketball" program on channel thirty-three (33) starting at 9:30 a.m. overlaps with the scheduled recording of the "Movie" program beginning at 11:00 a.m. which is indicated by the semi-transparent grid section 404. For the example two-tuner client device, the two tuners (e.g., the recording resources) are fully-allocated and another program can not be scheduled to be recorded during the time duration starting at 11:00 a.m. when the "Movie" program and the "College Basketball" program overlap without initiating a program recording conflict.

Although not shown, a semi-transparent grid section, such as the semi-transparent grid section 402, can be displayed within the program guide 122 along with a resource allocation bar, such as with the resource allocation bar 202 as shown in FIG. 2. A semi-transparent grid section can also be displayed along with a list of programs, such as with the list of programs 302 shown in FIG. 3, and/or with any combination of resource allocation bars and lists of programs.

Figure 5:
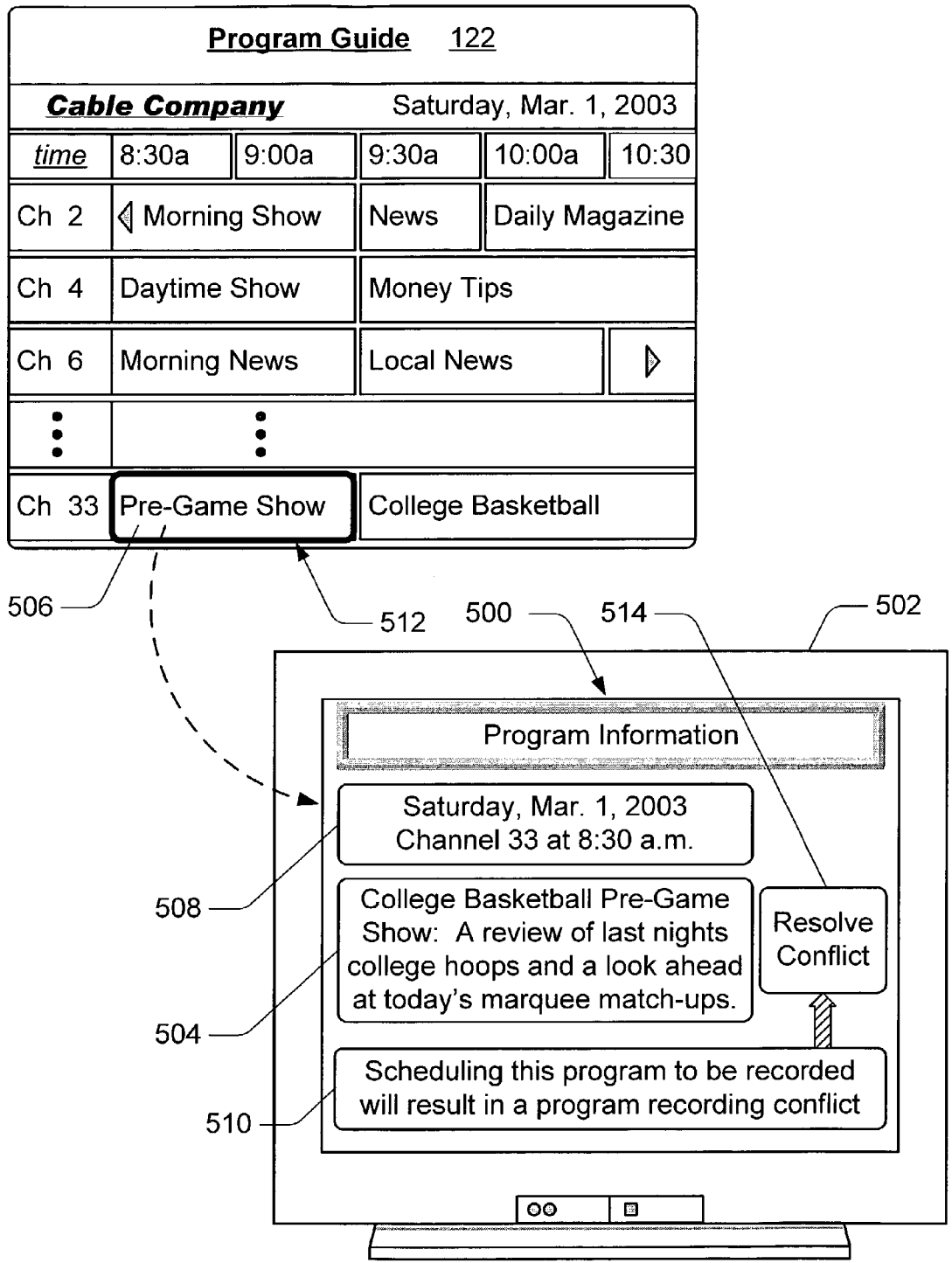
FIG. 5 illustrates a program information display with an exemplary program recording message.

FIG. 5 illustrates a program information display 500 on a display device 502. The program information display 500 includes a description 504 of a selected program 506 and may include other program information 508. For example, a user can select the program 506 from the program guide 122 with selectable control 512 to initiate that the program guide application 116 generate the program information display 500.

When a portion of the selected program 506 is scheduled for broadcast during a time duration in which client device recording resources are filly-allocated for other scheduled program recordings, the resource schedule application 114 (FIG. 1) generates a program recording message 510 for display with the program information 504 and 508 on display 502. The program recording message 510 indicates to a user that the client device recording resources are fully-allocated for the time duration, or for a portion of the time duration, in which the selected program 506 is scheduled to be broadcast. This provides the user with a visual indication that scheduling the selected program 506 to be recorded will result in a program recording conflict. The program information display 500 can include a selectable control 514 that when selected allows the user to resolve the potential recording conflict as described below with reference to the program recording conflict resolution guide shown in FIGS. 6A and 6B.

Figure 6A:
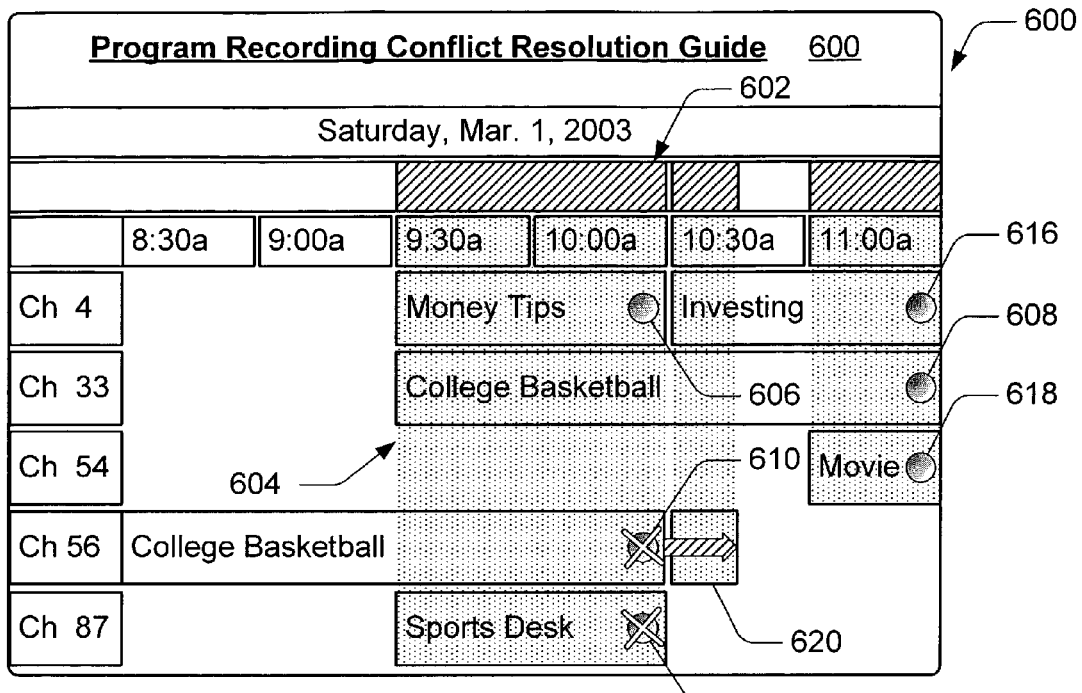
FIGS. 6A and 6B illustrate an exemplary program recording conflict resolution guide.
Figure 6B:
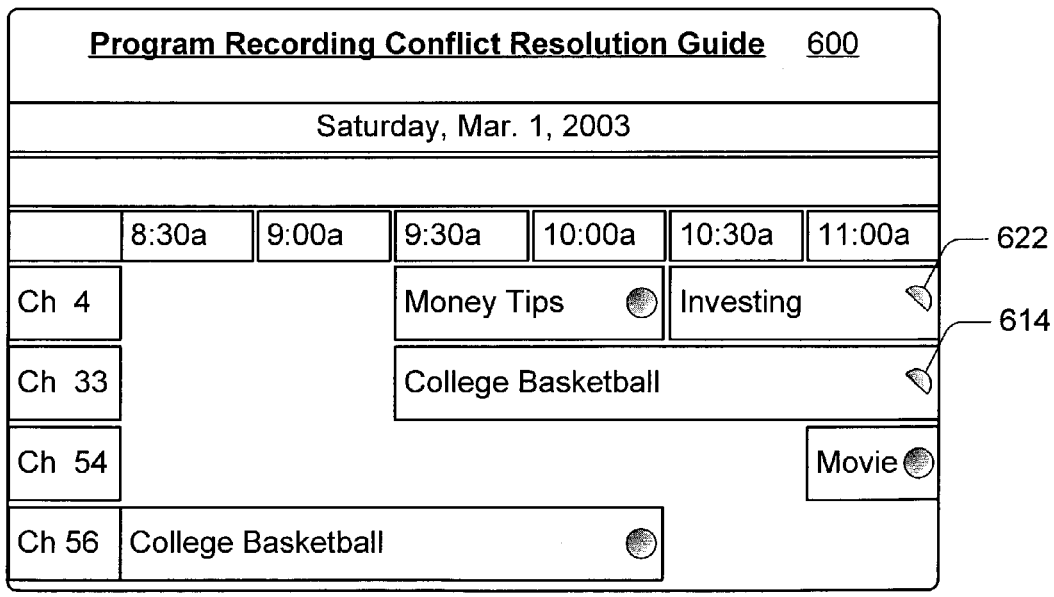

FIGS. 6A and 6B illustrate an exemplary program recording conflict resolution guide 600. The resource schedule application 114 (FIG. 1) generates the program recording conflict resolution guide 600 to display the programs that are scheduled to be recorded and which create a scheduling conflict due to the recording resources being fully-allocated for a time duration. For example, during a time duration from 9:30 a.m. to 10:30 a.m., programs, or portions thereof, that create a program recording scheduling conflict are identified by a resource allocation bar 602 and a semi-transparent grid section 604. Although the program recording scheduling conflicts are indicated with both the resource allocation bar 602 and the semi-transparent grid section 604, either of the recording resources indicators can be displayed independently to indicate a conflict with the recording resources.

A first program "Money Tips" on program channel four (4) starting at 9:30 a.m. is scheduled to be recorded as indicated by a program recording identifier 606, and a first tuner will be allocated to receive the program. A second program "College Basketball" on program channel thirty-three (33) also starting at 9:30 a.m. is scheduled to be recorded as indicated by a program recording identifier 608, and a second tuner will be allocated to receive the program. For the example two-tuner client device, the recording resources (e.g., the two tuners) are fully-allocated to receive and record the two programs.

There is a program recording conflict because a portion of another program "College Basketball" on program channel fifty-six (56) starting at 8:30 a.m. is scheduled to be recorded, in part during the time duration from 9:30 a.m. to 10:30 a.m., as indicated by a program recording identifier 610. Additionally, a program "Sports Desk" on program channel eighty-seven (87) starting at 9:30 a.m. is also scheduled to be recorded as indicated by a program recording identifier 612. For the example two-tuner client device, these two additional programs cause a recording conflict because the recording resources (e.g., the two tuners) are already fully-allocated.

The program recording identifiers 610 and 612 are each displayed within the program recording conflict resolution guide 600 with an "X" through them to indicate to a viewer that, if the program recording conflicts are not resolved, the programs associated with the program recording identifiers 610 and 612 will not be recorded as scheduled. For example, the program "College Basketball" on program channel fifty-six (56) starting at 8:30 a.m. will not be recorded during the time duration from 9:30 a.m. to 10:45 a.m. unless the program recording conflicts are resolved. Further, the program "Sports Desk" on program channel eighty-seven (87) starting at 9:30 a.m. will also not be recorded unless the program recording conflicts are resolved.

FIG. 6B illustrates that a user can resolve program recording conflicts from the program recording conflict resolution guide 600. One such resolution for the program recording conflicts scheduled during the time duration from 9:30 a.m. to 10:30 a.m. is shown in FIG. 6B. In this example, the program "Sports Desk" on program channel eighty-seven (87) is no longer scheduled to be recorded. Further the scheduled recording of program "College Basketball" on program channel thirty-three (33) has been modified to record only the last half of the program as indicated by the program recording identifier 614. The program recording identifier 614 is displayed as a portion of an identifier to indicate that only a portion of the program is scheduled to be recorded. Thus, for the example two-tuner client device, the scheduling conflicts for the recording resources (e.g., the two tuners) are resolved.

FIG. 6A also illustrates other program recording conflicts with programs, or portions thereof, that are scheduled to be recorded and which create a scheduling conflict due to the recording resources being fully-allocated for time durations from 10:30 a.m. to 10:45 a.m. and from 11:00 a.m. to 11:30 a.m. A first program "College Basketball" on program channel thirty-three (33) starting at 9:30 a.m. is scheduled to be recorded as indicated by the program recording identifier 608, and a first tuner will be allocated to receive the program. A second program "Investing" on program channel four (4) starting at 10:30 a.m. is scheduled to be recorded as indicated by a program recording identifier 616, and a second tuner will be allocated to receive the program. For the example two-tuner client device, the recording resources (e.g., the two tuners) are fully-allocated to receive and record the two programs during a time duration from 10:30 a.m. to 11:30 a.m.

There is a first program recording conflict because a portion of another program "Movie" on program channel fifty-four (54) starting at 11:00 a.m. is scheduled to be recorded, in part during the time duration from 11:00 a.m. to 11:30 a.m., as indicated by a program recording identifier 618. For the example two-tuner client device, this additional program causes a recording conflict because the recording resources (e.g., the two tuners) are already fully-allocated.

Additionally, there is a second program recording conflict because additional program recording time 620 is scheduled after the end of the program "College Basketball" on program channel fifty-six (56) starting at 8:30 a.m. Additional program recording time, also referred to as "padding", can be scheduled by a user or automatically set by the system to account for the possibility that a particular program runs over the scheduled broadcast time. This is common for sporting events, such as baseball and basketball, where the competition is extended to an overtime period and the program broadcast continues beyond the scheduled end of the broadcast. In this example, the additional program recording time 620 is scheduled to be recorded during the time duration from 10:30 a.m. to 10:45 a.m. and is visually distinct from the program itself so that a viewer can independently remove the additional program recording time from the program recording schedule while maintaining the scheduled recording of the associated program. Alternatively, if the padding cannot be removed, a message or other indication can inform the user as to why a conflicting recording cannot be scheduled. The program recording conflict resolution guide is particularly useful in this case, because padding is rarely shown on a program guide. Therefore, without the usage indicators, the user would have no-way of knowing that all of a tuner's resources are scheduled for use by the additional program recording time of a padded show. The usage indicators enable a user to override a system that implements automatic padding which may prevent the user from recording another program.

FIG. 6B also illustrates one example conflict resolution for the program recording conflicts scheduled during the time durations from 10:30 a.m. to 10:45 a.m. and from 11:00 a.m. to 11:30 a.m. In this example, the additional program recording time 620 after the end of the program "College Basketball" on program channel fifty-six (56) is no longer scheduled to be recorded. The scheduled recording of program "College Basketball" on program channel thirty-three (33) has been modified to record only the last half of the program as indicated by the portion of program recording identifier 614. Further, the scheduled recording of program "Investing" on program channel four (4) has been modified to record only the first half of the program as indicated by a program recording identifier 622. The program recording identifier 622 is displayed as a portion of an identifier to indicate that only a portion of the program is scheduled to be recorded. Thus, for the example two-tuner client device, the scheduling conflicts for the recording resources (e.g., the two tuners) are resolved.

The program recording conflict resolution guide 600 can be generated for display at any time that a recording conflict is scheduled. A user can then knowingly schedule a program recording conflict so that a program recording 11 conflict resolution guide is displayed from which the user can view all of the programs scheduled to be recorded for a particular time duration. The user can then resolve program recording conflicts without having to search line-by-line through an extensive listing of programs to try and locate which programs have been previously scheduled for recording at the time indicated as being a conflict. The program recording conflict resolution guide 600 can also be generated for a minimized or compressed display to show an entire conflict resolution guide that includes all of the programs scheduled to be recorded.

Figure 7:
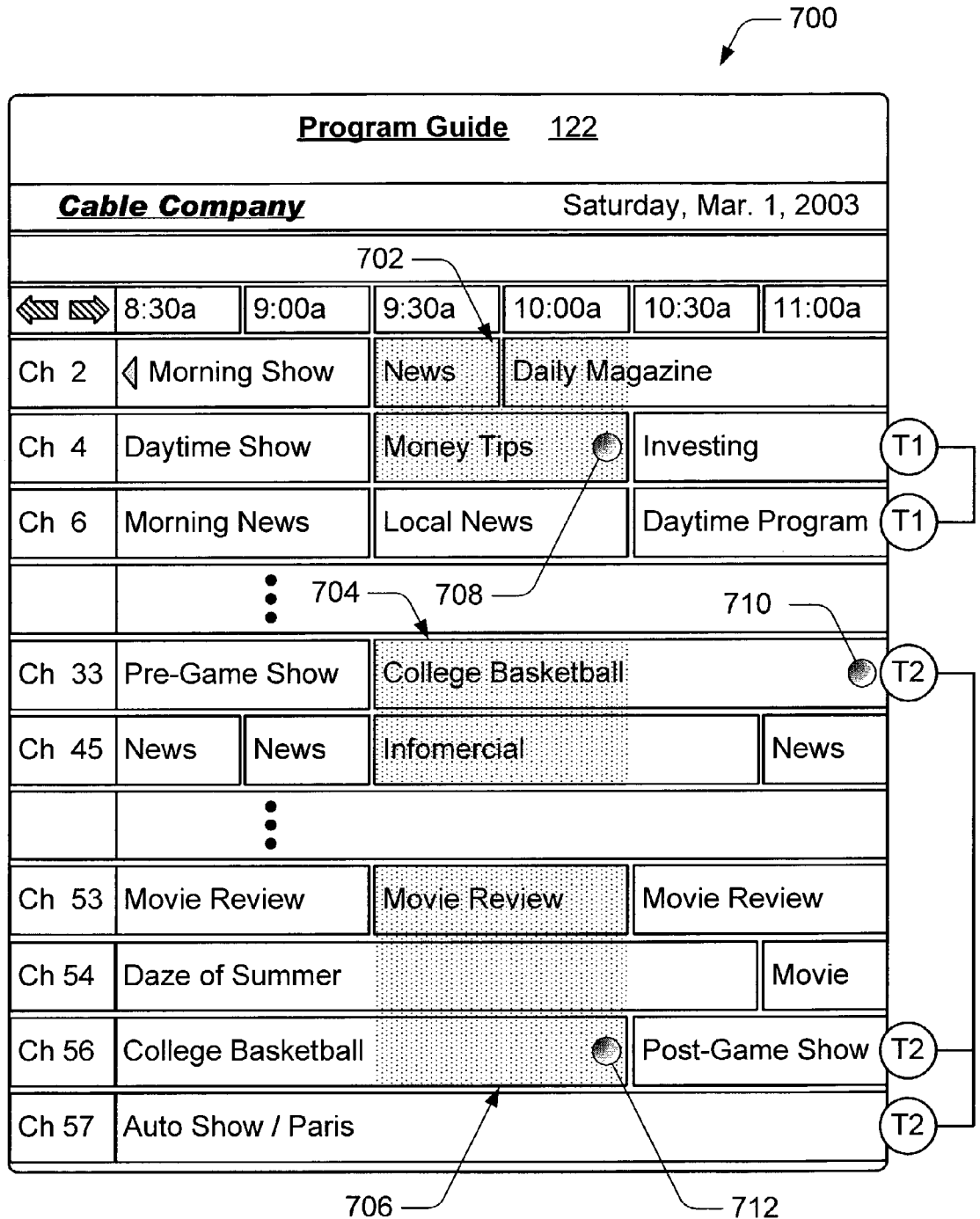
FIG. 7 illustrates a program guide with exemplary recording resources indicators for a transponder broadcast system.

FIG. 7 illustrates an exemplary implementation 700 of recording resources indicators displayed within a program guide 122 for a transponder broadcast system. A digital transponder is a digital signal over which more than one television channel, each consisting of multiple scheduled programs, can be received with a single client device tuner. Examples of client devices configured to receive digital transponder broadcasts are described in greater detail in U.S. patent application Ser. No. 10/094,048, filed Mar. 8, 2002, entitled "Transport Processor for Processing Multiple Transport Streams" to Coffin et al. which is incorporated by reference herein for the purpose of implementing recording resources indicators.

A client device configured to receive digital transponder broadcasts includes a processing circuit that receives and processes one or more transport input streams which are received from the content provider(s). Each transport input stream can include program content for multiple programs broadcast on one or more program channels. The client device may then be able to record multiple programs that are received with a single tuner. For example, three programs can be recorded with a two-tuner client device if at least two of the programs are broadcast on program channels that are received via a single transponder and if the client device includes sufficient de-multiplexing resources.

In the example shown in FIG. 7, the resource schedule application 114 (FIG. 1) generates recording resources indicators 702, 704, and 706 as semi-transparent grid sections for display within the program guide 122 to indicate that the recording resources are fully-allocated to one or more transponders to record scheduled programs for a time duration from 9:30 a.m. to 10:30 a.m. The program "Money Tips" on program channel four (4) starting at 9:30 a.m., the program "College Basketball" on program channel thirty-three (33) also starting at 9:30 a.m., and the program "College Basketball" on program channel fifty-six (56) starting at 8:30 a.m. are all scheduled to be recorded during the time duration as indicated by each of the respective program recording identifiers 708, 710, and 712.

As illustrated, program channel four (4) and program channel six (6) are received together via a first digital transponder. Similarly, program channel thirty-three (33), program channel fifty-six (56), and program channel fifty-seven (57) are received together via a second digital transponder. For the example two-tuner client device, the first program "Money Tips" on program channel four (4) can be received with the first tuner while the two programs "College Basketball" on channels thirty-three (33) and fifty-six (56) can be received with the second tuner because the two programs are received together via the second digital transponder.

The recording resources indicators 702, 704, and 706 (e.g., the semi-transparent grid sections in this example) also indicate, or identify, the programs that would create a recording conflict if they were scheduled to be recorded due to the recording resources being fully-allocated to record other programs. The programs that can not be recorded are those that are not received on the same transponder as any of the programs that are already scheduled to be recorded. For example, a program "Infomercial" on program channel forty-five (45) can not be scheduled to be recorded without creating a recording resources scheduling conflict because the program channel forty-five (45) is received via a digital transponder other than the first and second transponders.

Alternatively, the program "Local News" on program channel six (6) starting at 9:30 a.m. can be scheduled for recording because program channel six (6) is also received via the first digital transponder. The recording resource (e.g., the first tuner of the client device) can be allocated to receive the "Local News" program for recording along with the "Money Tips" program. Similarly, the second tuner of the client device can be allocated to receive the program "Auto Show/Paris" on program channel fifty-seven (57) for recording along with the two "College Basketball" programs because program channel fifty-seven (57) is also received via the second digital transponder.

Although not shown in FIG. 7, the semi-transparent grid sections 702, 704, and 706 can be displayed within the program guide 122 along with a resource allocation bar, such as with the resource allocation bar 202 as shown in FIG. 2, and/or can also be displayed along with a list of programs, such as with the list of programs 302 shown in FIG. 3. Any combination of recording resources indicators, such as resource allocation bars, lists of programs, semi-transparent grid sections, text messages, and the like, can be displayed together within a program guide to indicate when recording resources are fully-allocated to record programs.

Methods for recording resources indicators may be described in the general context of computer-executable instructions. Generally, computer-executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer-executable instructions may be located in both local and remote computer storage media, including memory storage devices.

Figure 8A:
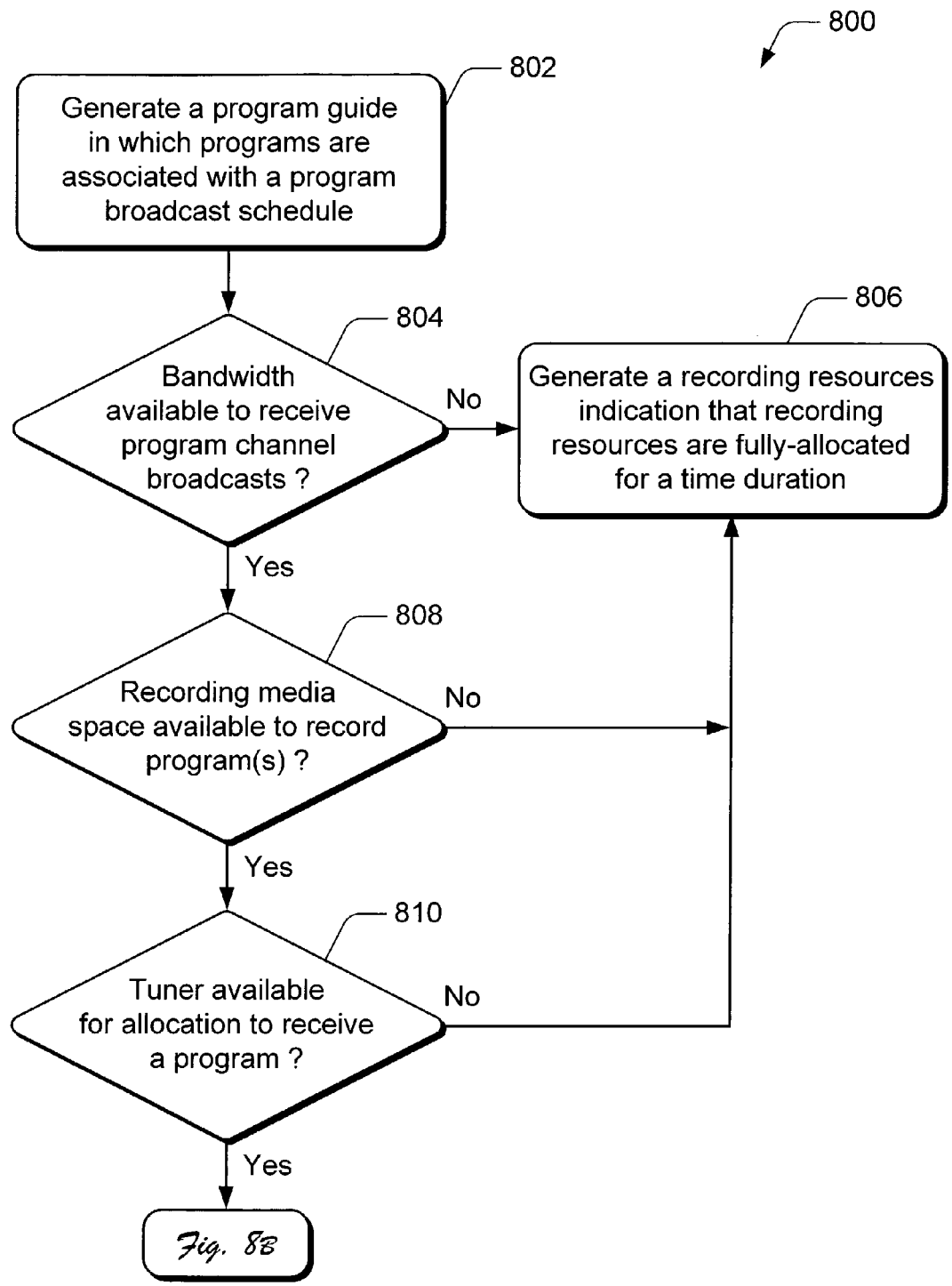

FIGS. 8A and 8B illustrate a method 800 for recording resources indicators. The order in which the method is described is not intended to be construed as a limitation, and any number of the described method blocks can be combined in any order to implement the method. Furthermore, the method can be implemented in any suitable hardware, software, firmware, or combination thereof.

At block 802 (FIG. 8A), a program guide is generated in which programs are associated with a program broadcast schedule. For example, program guide 1212 (FIG. 1) associates programs 128 with a program broadcast schedule 126 that includes a time 132 when each of the programs 128 are scheduled for broadcast on a program channel 130.

At block 804, a determination is made as to whether bandwidth is available to receive broadcasts of one or more program channels. This includes a determination as to whether bandwidth is available for a client device configured to receive digital transponder broadcasts of multiple program channels. If the bandwidth is not available (i.e., "no" from block 804), then a recording resources indication is generated to indicate that recording resources are fully-allocated for a time duration at block 806. For example, the resource scheduler 114 (FIG. 1) generates a recording resources indication, such as a resource allocation bar 202 (FIG. 2), a list of programs scheduled to be recorded 302 (FIG. 3), and/or a semi-transparent grid section 402 (FIG. 4) for display within the program guide 122 to indicate that recording resources are fully-allocated for a time duration during which the programs are scheduled to be recorded. The recording resources indication can be generated to indicate a beginning of the time duration and an end of the time duration during which the recording resources are fully-allocated.

If the bandwidth is available (i.e., "yes" from block 804), then a determination is made as to whether recording media space is available to record one or more of the programs at block 808. If the recording media space is not available (i.e., "no" from block 808), then the recording resources indication is generated to indicate that recording resources are fully-allocated for a time duration at block 806.

If the recording media space is available (i.e., "yes" from block 808), then a determination is made as to whether a tuner is available that can be allocated to receive a program during the time duration at block 810. This includes a determination as to whether a tuner can be allocated to tune to a transponder broadcast to receive one or more program channels for a client device configured to receive digital transponder broadcasts. If a tuner is not available (i.e., "no" from block 810), then the recording resources indication is generated to indicate that recording resources are fully-allocated for a time duration at block 806.

If a tuner is available (i.e., "yes" from block 810), then at least a sufficient portion of each of the recording resources is available to receive and record programs that have been scheduled to be recorded. Although this example only describes available bandwidth, recording media space, and tuner(s) as the recording resources, a client device can be implemented with any number and other types of recording resources to receive and record the programs.

At block 812 (FIG. 8B), an input is received to generate a program information display that includes a description of a selected program. For example, a program information display 500 (FIG. 5) is generated by the program guide application 116 (FIG. 1) to display a description 504 and other associated information 508 about a selected program 506. At block 814, a determination is made as to whether at least a portion of the selected program is scheduled for broadcast during a time duration when the recording resources are fully-allocated.

If the selected program, or a portion of the selected program, is scheduled for broadcast during the time duration when the recording resources are fully-allocated (i.e., "yes" from block 814), then a program recording message is generated for display with the program information to indicate that the recording resources are fully-allocated for the time duration at block 816. For example, the resource scheduler 114 (FIG. 1) generates the program recording message 510 (FIG. 5) for display with the program information. If the selected program, or a portion of the selected program, is not scheduled for broadcast during a time duration when the recording resources are fully-allocated (i.e., "no" from block 814), then a program recording message is generated for display with the program information to indicate that the recording resources are not fully-allocated for the time duration at block 818.

At block 820, an input is received to record a selected program, or a portion of a program, that is scheduled to be broadcast. At block 822, a determination is made as to whether the recording resources are fully-allocated to record other programs during a time duration in which the selected program is scheduled to be broadcast. If the recording resources are fully-allocated to record other programs (i.e., "yes" from block 822), then a program recording conflict resolution guide is generated at block 824. For example, the resource scheduler 114 (FIG. 1) generates the program recording conflict resolution guide 600 (FIG. 6) that displays each program scheduled to be recorded over a time duration in which one or more of the programs scheduled to be recorded create a scheduling conflict due to the recording resources being fully-allocated to record other programs.

If the recording resources are not fully-allocated to record other programs (i.e., "no" from block 822), then recording resources are allocated to receive and record the selected program that is scheduled to be recorded at block 826. For example, a tuner 112 (FIG. 1) in a client device 102 is allocated to tune to a program channel on which the selected program will be received for a time duration corresponding to the scheduled program broadcast time. This includes allocating a tuner to tune to a transponder broadcast on which one or more program channels will be received for a client device configured to receive digital transponder broadcasts.

Figure 9:
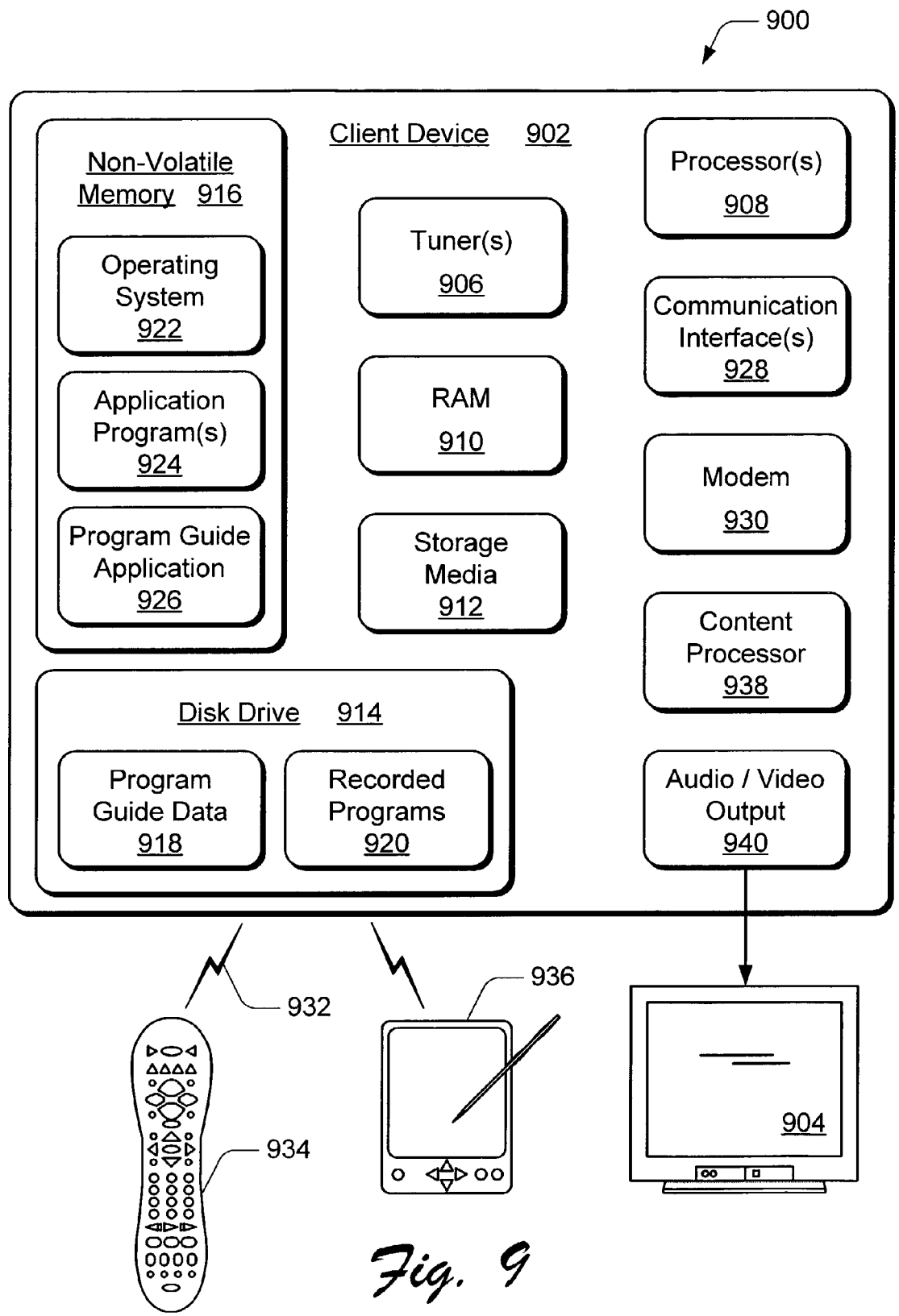
FIG. 9 illustrates various components of an exemplary client device implemented in a television-based system.

FIG. 9 illustrates a television-based system 900 that includes an exemplary client device 902 which includes components to implement recording resources indicators. System 900 also includes a display device 904 to display the program guide 122 and the recording resources schedule indicators, as well as the program recording conflict resolution guide 600 (FIG. 6). Exemplary client device 902 can be implemented as a set-top box, a satellite receiver, a TV recorder with a hard disk, a digital video recorder (DVR) and playback system, a game console, an information appliance, and as any number of similar embodiments.

Client device 902 includes one or more tuners 906 which are representative of one or more in-band tuners that tune to various frequencies or channels to receive television signals, as well as an out-of-band tuner that tunes to the program channel over which program data is broadcast to client device 902. Client device 902 also includes one or more processors 908 (e.g., any of microprocessors, controllers, and the like) which process various instructions to control the operation of client device 902 and to communicate with other electronic and computing devices.

Client device 902 can be implemented with one or more memory components, examples of which include a random access memory (RAM) 910, mass storage media 912, a disk drive 914, and a non-volatile memory 916 (e.g., any one or more of a read-only memory (ROM), flash memory, EPROM, EEPROM, etc.). Disk drive 914 can include any type of magnetic or optical storage device, such as a hard disk drive, a magnetic tape, a recordable and/or rewriteable compact disc (CD), a DVD, a DVD+RW, and the like. The one or more memory components provide data storage mechanisms to store various information and/or data such as received content, program guide data 918, recorded programs 920, configuration information for client device 902, graphical user interface information, and any other types of information and data related to operational aspects of client device 902. Alternative implementations of client device 902 can include a range of processing and memory capabilities, and may include any number of differing memory components than those illustrated in FIG. 9. For example, full-resource clients can be implemented with substantial memory and processing resources, whereas low-resource clients may have limited processing and memory capabilities.

An operating system 922 and one or more application programs 924 can be stored in non-volatile memory 916 and executed on processor(s) 908 to provide a runtime environment. A runtime environment facilitates extensibility of client device 902 by allowing various interfaces to be defined that, in turn, allow application programs 924 to interact with client device 902. The application programs 924 can include a browser to browse the Web (e.g., "World Wide Web"), an email program to facilitate electronic mail, and any number of other application programs.

A program guide application 926 that executes on processor(s) 908 is also stored in non-volatile memory 916 and is implemented to process the program guide data 918. Program guide application 926 generates the program guides which enable a viewer to navigate through an onscreen display and locate broadcast programs, recorded programs, video on-demand programs and movies, interactive game selections, and other media access information or content of interest to the viewer. With program guide application 926, the television viewer can look at schedules of current and future programming, set reminders for upcoming programs, and/or enter instructions to record one or more programs.

Client device 902 further includes one or more communication interfaces 928 and a PSTN, DSL, cable, or other type of modem 930. The communication interface(s) 928 can be implemented as any one or more of a serial and/or parallel interface, as a wireless interface, any type of network interface, and as any other type of communication interface. A wireless interface enables client device 902 to receive control input commands 932 and other information from a user-operated input device, such as from a remote control device 934 or from another infrared (IR), 802.11, Bluetooth, or similar RF input device. Input devices can include a wireless keyboard or another handheld input device 936 such as a personal digital assistant (PDA), handheld computer, wireless phone, or the like.

A network interface provides a connection between client device 902 and a data communication network which allows other electronic and computing devices coupled to a common data communication network to communicate information to client device 902 via the network. Similarly, a serial and/or parallel interface provides a data communication path directly between client device 902 and another electronic or computing device to interact and communicate with the other device via any number of the various communication links. Modem 930 facilitates client device 902 communication with other electronic and computing devices via a conventional telephone line, a DSL connection, cable, and/or other type of connection.

Client device 902 also includes a content processor 938 which can include a video decoder and/or additional processors to receive, process, and decode broadcast video signals and program data, such as NTSC, PAL, SECAM, or other television system analog video signals, as well as DVB, ATSC, or other television system digital video signals. For example, content processor 938 can include an MPEG-2 or MPEG-4 (Moving Pictures Experts Group) decoder that decodes MPEG-encoded video content and/or image data. The systems described herein can be implemented for any type of video encoding format as well as for data and/or content streams that are not encoded.

Typically, video content and program data includes video data and corresponding audio data. Content processor 938 generates video and/or display content that is formatted for display on display device 904, and generates decoded audio data that is formatted for presentation by a presentation device, such as one or more speakers (not shown) in display device 904. Content processor 938 can include a display controller (not shown) that processes the video and/or display content to display corresponding images on display device 904. A display controller can be implemented as a graphics processor, microcontroller, integrated circuit, and/or similar video processing component to process the images.

Client device 902 also includes an audio and/or video output 940 that provides the audio, video, and/or display signals to television 904 or to other devices that process and/or display, or otherwise render, the audio and video data. Video signals and audio signals can be communicated from client device 902 to television 904 via an RF (radio frequency) link, S-video link, composite video link, component video link, analog audio connection, or other similar communication links.

Although shown separately, some of the components of client device 902 may be implemented in an application specific integrated circuit (ASIC). Additionally, a system bus (not shown) typically connects the various components within client device 902. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Figure 10:
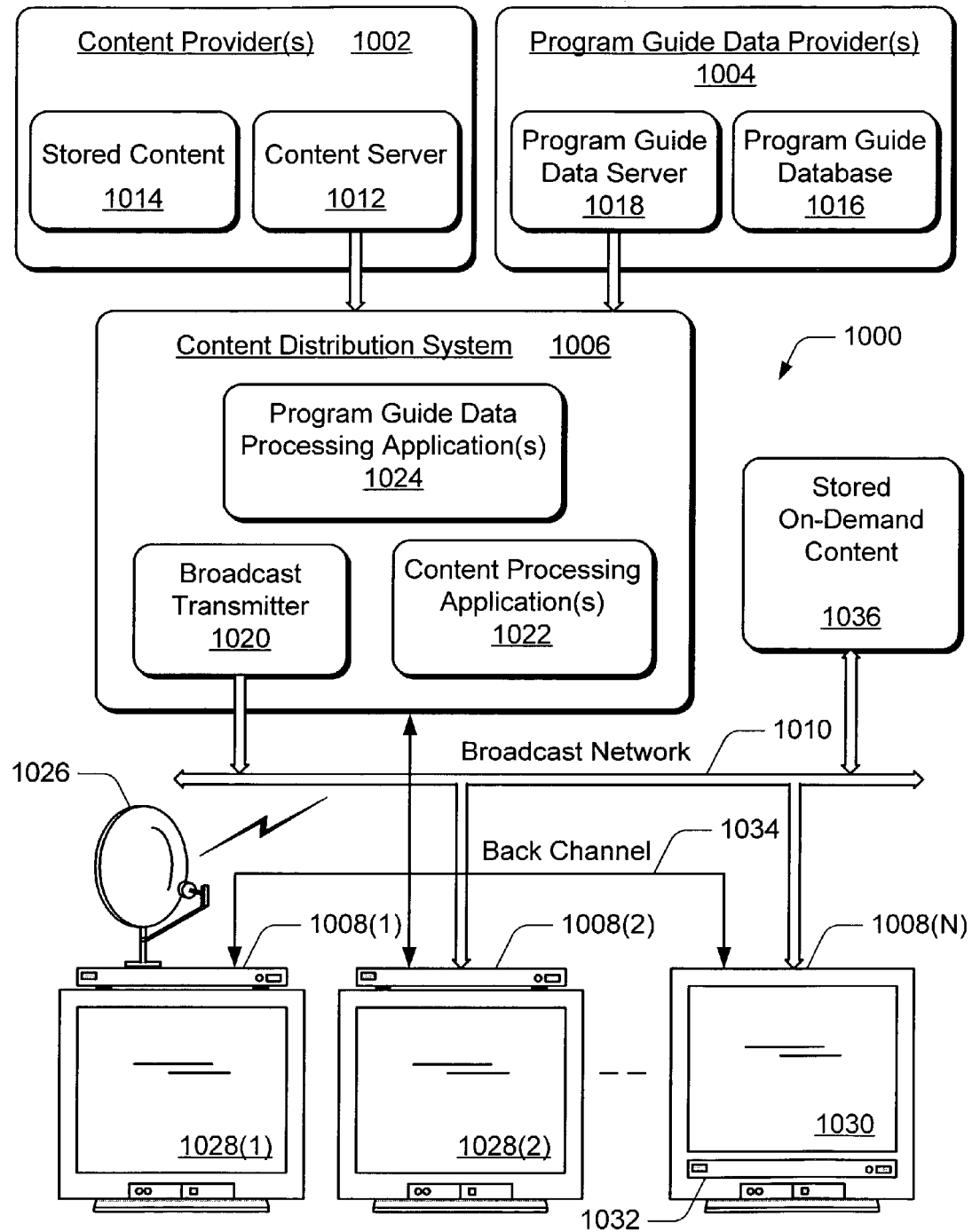
FIG. 10 illustrates an exemplary system architecture in which recording resources indicators can be implemented.

FIG. 10 illustrates an exemplary system architecture 1000 in which recording resources indicators can be implemented. System 1000 facilitates distribution of content and program guide data to multiple viewers. The system 1000 includes one or more content providers 1002, one or more program guide data providers 1004, a content distribution system 1006, and multiple client devices 1008(1), 1008(2), . . . , 1008(N) coupled to the content distribution system 1006 via a broadcast network 1010.

A content provider 1002 can be implemented as a satellite operator, a network television operator, a cable operator, and the like. A content provider 1002 includes a content server 1012 to control distribution of stored content 1014, such as movies, television programs, commercials, music, and similar audio, video, and/or image content from content provider 1002 to the content distribution system 1006. Additionally, content server 1012 controls distribution of live content (e.g., content that was not previously stored, such as live feeds) and/or content stored at other locations to the content distribution system 1006.

A program guide data provider 1004 includes a program guide database 1016 and a program guide data server 1018. The program guide database 1016 stores electronic files of program guide data which is used to generate an electronic or interactive program guide (or, "program guide"). Program guide data can include a program title, program broadcast day(s) to identify which days of the week the program will be broadcast, program start times(s) to identify a time that the program will be broadcast on the particular day or days of the week, and a program category. A program category describes the genre of a program and categorizes it as a particular program type. For example, a program can be categorized as a movie, a comedy, a sporting event, a news program, a sitcom, a talk show, or as any number of other category descriptions. Program guide data can also include program ratings, characters, descriptions, actor names, station identifiers, channel identifiers, other schedule information, and so on. Additionally, program guide data may include video on-demand content information, such as movie schedules, as well as application information, such as for interactive games, and other programming information that may be of interest to a viewer.

The program guide data server 1018 processes the program guide data prior to distribution to generate a published version of the program guide data which can contain programming information for all broadcast channels and on-demand content listings for one or more days. The processing may involve any number of techniques to reduce, modify, or enhance the program data such as data compression, format modification, and the like. The program guide data server 1018 controls distribution of the published version of the program guide data from a program guide data provider 1004 to the content distribution system 1006 using, for example, a file transfer protocol (FTP) over a TCP/IP network (e.g., Internet or Intranet). Further, the published version of the program guide data can be transmitted from program data provider 1004 via a satellite and the content distribution system 1006 directly to a client device 1008.

Content distribution system 1006 is representative of a headend service and/or program data center that provides program guide data, as well as content, to multiple subscribers (e.g., client devices 1008). Each content distribution system 1006 may receive a different version of the program guide data that takes into account different programming preferences and lineups. The program guide data server 1018 can create different versions of the program guide data that includes those channels of relevance to respective headend services, and the content distribution system 1006 transmits the program guide data to the multiple client devices 1008. In one implementation, for example, content distribution system 1006 utilizes a carousel file system to repeatedly broadcast the program guide data over an out-of-band (OOB) channel to the client devices 1008. Alternatively, the multiple client devices 1008 can receive standard, or uniform, program guide data and individually determine which program guide data to display based on the associated headend service.

Content distribution system 1006 includes a broadcast transmitter 1020, one or more content processing applications 1022, and one or more program guide data processing applications 1024. Broadcast transmitter 1020 broadcasts signals, such as cable television signals, across broadcast network 1010. Broadcast network 1010 can include a cable television network, RF, microwave, satellite, and/or data network, such as the Internet, and may also include wired or wireless transmission media using any broadcast format or broadcast protocol. Additionally, broadcast network 1010 can be any type of network, using any type of network topology and any network communication protocol, and can be represented or otherwise implemented as a combination of two or more networks.

A content processing application 1022 processes the content received from a content provider 1002 prior to transmitting the content across broadcast network 1010. Similarly, a program guide data processing application 1024 processes the program guide data received from a program guide data provider 1004 prior to transmitting the program guide data across broadcast network 1010. A particular content processing application 1022 may encode, or otherwise process, the received content into a format that is understood by the multiple client devices 1008 which are coupled to broadcast network 1010. Although FIG. 10 shows a single content provider 1002, a single program guide data provider 1004, and a single content distribution system 1006, exemplary system 1000 can include any number of content providers and/or program guide data providers coupled to any number of content distribution systems.

Client devices 1008 can be implemented in a number of ways. For example, a client device 1008(1) receives broadcast content from a satellite-based transmitter via a satellite dish 1026. Client device 1008(1) is also referred to as a set-top box or a satellite receiving device. Client device 1008(1) is coupled to a television 1028(1) for presenting the content received by the client device (e.g., audio data, video data, and image data), as well as a graphical user interface. A particular client device 1008 can be coupled to any number of televisions 1028 and/or similar devices that can be implemented to display or otherwise render content. Similarly, any number of client devices 1008 can be coupled to a single television 1028.

Client device 1008(2) is also coupled to receive broadcast content from broadcast network 1010 and provide the received content to associated television 1028(2). Client device 1008(N) is an example of a combination television 1030 and integrated set-top box 1032. In this example, the various components and functionality of the set-top box are integrated into the television, rather than using two separate devices. The set-top box integrated into the television can receive broadcast signals via a satellite dish (similar to satellite dish 1026) and/or via broadcast network 1010. In alternate implementations, client devices 1008 may receive broadcast signals via the Internet or any other broadcast medium, such as back channel 1034 which can be implemented as a Internet protocol (IP) connection or as other protocol connections using a modem connection and conventional telephone line, for example. Further, back channel 1034 provides an alternate communication link between each of the client devices 1008, and between the client devices 1008 and the content distribution system 1006.

The exemplary system 1000 also includes stored on-demand content 1036, such as video on-demand (VOD) movie content. The stored on-demand content 1036 can be viewed with a television 1028 via a client device 1008 through an onscreen movie guide, for example, and a viewer can enter instructions to stream a particular movie, or other stored content, to a corresponding client device 1008.

Although the invention has been described in language specific to structural features and/or methods, it is to be understood that the invention defined in the appended claims is not necessarily limited to the specific features or methods described. Rather, the specific features and methods are disclosed as exemplary implementations of the claimed invention.

The invention claimed is:

1. A recording resources indication system, comprising:
plural recording resources, each recording resource configured for allocation to a different program that is scheduled to be recorded;
a program guide application configured to generate a program guide in which programs are associated with a program broadcast schedule, said program guide comprising a grid listing the programs according to a program channel and a time when each of the programs are scheduled for broadcast; and
a resource scheduler configured to generate a recording resources indication for display within the program guide to indicate that the plural recording resources are fully-allocated for a particular time duration during which a plurality of the programs are scheduled to be recorded, wherein the recording resources indication is generated by placing an indicator in a resource allocation bar located above or below the grid listing the programs, wherein the recording resources indication further includes a list of one or more programs scheduled to be recorded during the particular time duration for which the plural recording resources are fully allocated, said list of programs being displayed in conjunction with the indicator in the resource allocation bar adjacent to the particular time duration in the grid during which the recording resources are fully allocated.

2. A recording resources indication system as recited in claim 1, wherein the plural recording resources are tuners, each tuner configured to tune to a different program channel.

3. A recording resources indication system as recited in claim 1, wherein the plural recording resources include:
a recording media configured to maintain recorded programs; and
multiple tuners each configured to tune to a different program channel to receive a program scheduled to be recorded with the recording media.

4. A recording resources indication system as recited in claim 1, wherein the resource scheduler generates the recording resources indication in the resource allocation bar adjacent to a time duration during which the recording resources are fully allocated to indicate a beginning of the time duration and an end of the time duration during which the plural recording resources are fully-allocated.

5. A recording resources indication system as recited in claim 1,
wherein the list of one or more programs scheduled to be recorded includes a program name and corresponding channel for each program listed,
wherein one or more of the programs listed in the list of programs to be recorded correspond to channels that are not visible in a current view of the grid listing the programs.

6. A recording resources indication system as recited in claim 1, wherein:
the grid is arranged with time on a horizontal axis and program channels on a vertical axis, and
the resource scheduler generates the recording resources indication as the resource allocation bar in a position adjacent to the time on the horizontal axis, with the list of the one or more programs scheduled to be recorded being listed above the grid adjacent to the resource allocation bar.

7. A recording resources indication system as recited in claim 1, wherein the resource scheduler further generates the recording resources indication as a semi-transparent section of the grid in conjunction with the indicator in the resource allocation bar to indicate a beginning of the time duration and an end of the time duration during which the plural recording resources are fully-allocated.

8. A recording resources indication system as recited in claim 1, wherein:
the resource scheduler further generates the recording resources indication as a semi-transparent section of the grid in conjunction with the indicator in the resource allocation bar to indicate a beginning of the time duration and an end of the time duration during which the plural recording resources are fully-allocated; and
the resource scheduler further generates the list of the one or more programs scheduled to be recorded during the time duration, the list of programs being generated for display within the program guide adjacent to the particular time duration in the grid during which the plural recording resources are fully allocated, wherein the one or more programs listed in the list of programs to be recorded correspond to channels that are not shown in a current view of the grid.

9. A recording resources indication system as recited in claim 1, wherein:
the program guide application is further configured to generate a program information display that includes a description of a selected program, at least a portion of the selected program being scheduled for broadcast during the time duration; and
the resource scheduler is further configured to generate a program recording message for display on the program information display, the program recording message indicating that the plural recording resources are fully-allocated for the time duration.

10. A recording resources indication system as recited in claim 1, wherein the resource scheduler is further configured to generate a program recording conflict resolution guide that displays each program scheduled to be recorded over a time duration in which one or more of the programs scheduled to be recorded create a scheduling conflict due to the plural recording resources being fully-allocated for program recording during the time duration.

11. A television-based client device comprising the recording resources indication system as recited in claim 1.

12. A digital video recorder comprising the recording resources indication system as recited in claim 1.

13. A recording resources indication system, comprising:
plural recording resources, each recording resource configured for allocation to a different program that is scheduled to be recorded;
a program guide application configured to generate a program guide in which programs are associated with a program broadcast schedule, said program guide comprising a grid listing the programs according to a program channel and a time when each of the programs are scheduled for broadcast; and
a resource scheduler configured to generate a recording resources indication for display within the program guide to indicate that the plural recording resources are fully-allocated for a time duration during which a plurality of the programs are scheduled to be recorded, wherein the indication is displayed as a semi-transparent section of the grid extending across a plurality of the channels displayed in the grid for a particular time duration to indicate a beginning of the particular time duration and an end of the particular time duration during which the plural recording resources are fully-allocated, wherein the indication further includes a list of one or more programs scheduled to be recorded during the particular time duration for which the plural recording resources are fully allocated, said list of programs being displayed in the program guide adjacent to the particular time duration in the grid during which the recording resources are fully allocated.

14. A recording resources indication system as recited in claim 13, wherein the plural recording resources are tuners, each tuner configured to tune to a different program channel.

15. A recording resources indication system as recited in claim 13, wherein the resource scheduler is further configured to generate a resource allocation bar for display within the program guide, the resource allocation bar indicating a beginning of the particular time duration and an end of the particular time duration during which the plural recording resources are fully-allocated.

16. A recording resources indication system as recited in claim 13, wherein the resource scheduler is further configured to generate a program recording conflict resolution guide that displays each program scheduled to be recorded over the time duration in which one or more of the programs scheduled to be recorded create a scheduling conflict due to the plural recording resources being fully-allocated for program recording during the particular time duration.

17. A recording resources indication system as recited in claim 16, wherein the resource scheduler is further configured to generate the program recording conflict resolution guide to display additional recording time scheduled after the end of a program.

18. A television-based client device comprising the recording resources indication system as recited in claim 13.

19. A digital video recorder comprising the recording resources indication system as recited in claim 13.

20. A recording resources indication system, comprising:
one or more recording resources each configured for allocation to a different transponder broadcast which includes one or more program channels that each include one or more programs which are scheduled to be recorded;
a program guide application configured to generate a program guide in which the programs are associated with a program broadcast schedule that includes a time when each of the programs are scheduled for broadcast on a program channel, wherein the program guide comprises a grid listing the programs according to a program channel and a time when each of the programs are scheduled for broadcast; and
a resource scheduler configured to generate a recording resources indication for display within the program guide to indicate that the one or more recording resources are fully-allocated for a particular time duration during which one or more of the programs are scheduled to be recorded, wherein the recording resources indication includes a list of one or more programs scheduled to be recorded during the particular time duration for which the one or more recording resources are fully allocated, said list of programs being displayed in conjunction with the resource allocation bar adjacent to the time duration in the grid during which the recording resources are fully allocated.

21. A recording resources indication system as recited in claim 20, wherein the one or more recording resources are a plurality of tuners, each tuner configured to tune to a different transponder broadcast to receive one or more of the programs.

22. A recording resources indication system as recited in claim 20, wherein the one or more recording resources include:
a recording media configured to maintain recorded programs; and
multiple tuners each configured to tune to a different transponder broadcast to receive one or more programs scheduled to be recorded with the recording media.

23. A recording resources indication system as recited in claim 20,
wherein the recording resources indication is further displayed as a resource allocation bar located above the grid to indicate a beginning of the particular time duration and an end of the particular time duration during which the one or more recording resources are fully-allocated, each to a different transponder broadcast.

24. A recording resources indication system as recited in claim 20,
wherein the list of one or more programs scheduled to be recorded includes a program name and corresponding channel for each program listed,
wherein the one or more programs listed in the list of programs to be recorded correspond to channels that are not visible in a current view of the grid listing the programs.

25. A recording resources indication system as recited in claim 20,
wherein the recording resources indication is further displayed as a semi-transparent section of the grid extending across a plurality of the channels displayed in the grid for the particular time duration to indicate a beginning of the particular time duration and an end of the particular time duration during which the plural recording resources are fully-allocated.

26. A recording resources indication system as recited in claim 20, wherein:
the resource scheduler further generates the recording resources indication as a resource allocation bar displayed above the grid to indicate a beginning of the particular time duration and an end of the particular time duration during which the plural recording resources are fully-allocated each to a different transponder broadcast; and
the resource scheduler further generates a semi-transparent section of the grid extending across a plurality of the channels displayed in the grid for the particular time duration to indicate each program that cannot be recorded because a recording conflict would be created if scheduled for recording during the particular time duration.

27. A recording resources indication system as recited in claim 20, wherein the resource scheduler is further configured to generate a program recording conflict resolution guide that displays each program scheduled to be recorded over the particular time duration in which one or more of the programs scheduled to be recorded create a scheduling conflict with one or more of the recording resources.

28. A television-based client device comprising the recording resources indication system as recited in claim 20.

29. A digital video recorder comprising the recording resources indication system as recited in claim 20.

30. A recording resources indication system, comprising:
plural recording resources, each recording resource configured for allocation to a different program that is scheduled to be recorded;
a program guide application configured to generate a program guide in which programs are associated with a program broadcast schedule, said program guide comprising a grid listing the programs according to a program channel and a time when each of the programs are scheduled for broadcast; and a resource scheduler configured to generate a recording resources indication for display within the program guide to indicate that the plural recording resources are fully-allocated for a particular time duration during which plural programs are scheduled to be recorded, wherein the indication is a list of the plural programs that are scheduled to be recorded over the particular time duration during which the recording resources are fully allocated, said list being displayed above or below the grid adjacent to the particular time duration.

31. A recording resources indication system as recited in claim 30, wherein the recording resources are tuners, each tuner configured to tune to a different program channel.

32. A recording resources indication system as recited in claim 30, wherein the recording resources are tuners, each tuner configured to tune to a different transponder broadcast to receive one or more programs over one or more program channels.

33. A recording resources indication system as recited in claim 30, wherein the recording resources indication further includes a resource allocation bar displayed above or below the grid that indicates a beginning of the particular time duration and an end of the particular time duration during which the recording resources are fully-allocated to record the plural programs that are scheduled to be recorded.

34. A recording resources indication system as recited in claim 30,
wherein the list of the plural programs that are scheduled to be recorded includes a program name and channel for each of the plural programs,
wherein one or more of the programs listed in the list of programs to be recorded correspond to channels that are not visible in a current view of the grid listing the programs.

35. A recording resources indication system as recited in claim 30, wherein the recording resources indication further includes a semi-transparent section of the grid extending across a plurality of the channels displayed in the grid for the particular time duration that indicates a beginning of the particular time duration and an end of the particular time duration during which the recording resources are fully-allocated to record the plural programs that are scheduled to be recorded.

36. A recording resources indication system as recited in claim 30, wherein the recording resources indication further includes a program recording message displayed with program information about a selected program, the program recording message indicating that the recording resources are fully allocated for a time duration during which at least a portion of the selected program is scheduled to be broadcast.

37. A method, comprising:
generating a program guide in which programs are associated with a program broadcast schedule, said program guide comprising a grid listing the programs according to a program channel along a vertical axis and a time when each of the programs are scheduled for broadcast along a horizontal axis;
receiving an input to record a first program that is scheduled to be broadcast during a first time duration;
allocating a first tuner to tune to a first program channel on which the first program will be broadcast;
receiving a second input to record a second program that is scheduled to be broadcast during the first time duration;
allocating a second tuner to tune to a second program channel on which the second program will be broadcast;
receiving a third input to record a third program that is scheduled to be broadcast during the first time duration;
generating a recording resources indication for display within the program guide to indicate that recording resources are fully-allocated for the first time duration during which the first and second programs are scheduled to be recorded, said recording resources indication comprising a list of at least one of the first and second programs that are scheduled to be recorded over the first time duration during which the recording resources are fully allocated, said list being displayed above or below the grid adjacent to the first time duration, wherein one or more of the programs displayed in the list of programs to be recorded correspond to channels that are not visible in a current view of the grid listing the programs, and further comprising at least one of:
a resource allocation bar displayed above or below the grid, said resource allocation bar including an indicator to indicate a beginning of the first time duration and an end of the first time duration during which the recording resources are fully-allocated; or
a semi-transparent section of the grid extending across a plurality of the channels displayed in the grid for the first time duration to indicate a beginning of the first time duration and an end of the first time duration during which the recording resources are fully-allocated.

38. A method as recited in claim 37, wherein generating includes generating the recording resources indication to indicate that available bandwidth over which the program channels are received is fully-allocated for the time duration.

39. A method as recited in claim 37, wherein generating includes generating the recording resources indication to indicate that available bandwidth over which to receive one or more transponder broadcasts of the program channels is fully-allocated for the time duration.

40. A method as recited in claim 37, wherein generating includes generating the recording resources indication to indicate that recording media space to record the programs is fully-allocated for the time duration.

41. A method as recited in claim 37, wherein the recording resources include the first and second tuners, each tuner configured to tune to a different program channel, and wherein generating includes generating the recording resources indication to indicate that the first and second tuners are fully-allocated for the time duration.

42. A method as recited in claim 37, wherein the recording resources include the first and second tuners, each tuner configured to tune to a different transponder broadcast, and wherein generating includes generating the recording resources indication to indicate that the plural tuners are fully-allocated for the time duration.

43. A method as recited in claim 37, further comprising:
generating a program information display that includes a description of a selected program, at least a portion of the selected program being scheduled for broadcast during the first time duration; and
generating a program recording message for display on the program information display, the program recording message indicating that the recording resources are fully allocated for the first time duration.

44. A method as recited in claim 37, further comprising generating a program recording conflict resolution guide that displays each program scheduled to be recorded over the first time duration in which the first and second programs scheduled to be recorded create a scheduling conflict due to the recording resources being fully-allocated for program recording during the time duration.

45. One or more computer-readable media comprising computer-executable instructions that, when executed, direct a television-based client device to perform the method of claim 37.

46. One or more computer-readable media comprising computer-executable instructions that, when executed, direct a digital video recorder to perform the method of claim 37.

47. One or more computer-readable media comprising computer executable instructions that, when executed, direct a digital video recorder to:
 generate a program guide in which programs are associated with a program broadcast schedule, said program guide comprising a grid listing the programs according to a program channel and a time when each of the programs are scheduled for broadcast;
 allocate recording resources to record one or more of the programs when the one or more programs are scheduled to be broadcast; and
 generate a recording resources indication for display within the program guide to indicate that the recording resources are fully-allocated for a first time duration during which the one or more programs are scheduled to be recorded, said recording resources indication comprising a list of the one or more programs that are scheduled to be recorded over the first time duration during which the recording resources are fully allocated, said list being displayed above or below the grid adjacent to the first time duration, wherein one or more of the programs displayed in the list of programs to be recorded correspond to channels that are not visible in a current view of the grid listing the programs, and further comprising at least one of:
 a resource allocation bar displayed above or below the grid, said resource allocation bar including an indicator to indicate a beginning of the first time duration and an end of the first time duration during which the recording resources are fully-allocated; or
 a semi-transparent section of the grid extending across a plurality of the channels displayed in the grid for the first time duration to indicate a beginning of the first time duration and an end of the first time duration during which the recording resources are fully-allocated.

48. One or more computer-readable media as recited in claim 47, further comprising computer executable instructions that, when executed, direct the digital video recorder to receive plural inputs that each initiate allocation of a recording resource to record a program that is scheduled to be broadcast at least in part during the first time duration.

49. One or more computer-readable media as recited in claim 47, further comprising computer executable instructions that, when executed, direct the digital video recorder to generate the recording resources indication when available bandwidth over which one or more program channels are received is fully-allocated for the first time duration.

50. One or more computer-readable media as recited in claim 47, further comprising computer executable instructions that, when executed, direct the digital video recorder to generate the recording resources indication when available bandwidth over which to receive one or more transponder broadcasts of one or more program channels is fully-allocated for the first time duration.

51. One or more computer-readable media as recited in claim 47, further comprising computer executable instructions that, when executed, direct the digital video recorder to generate the recording resources indication when recording media space to record the one or more programs is fully-allocated for the first time duration.

52. One or more computer-readable media as recited in claim 47, further comprising computer executable instructions that, when executed, direct the digital video recorder to allocate one or more tuners as the recording resources, each tuner configured to tune to a different program channel to receive the one or more programs.

53. One or more computer-readable media as recited in claim 47, further comprising computer executable instructions that, when executed, direct the digital video recorder to allocate one or more tuners as the recording resources, each tuner configured to tune to a different transponder broadcast of one or more program channels to receive the one or more programs.

54. One or more computer-readable media as recited in claim 47, further comprising computer executable instructions that, when executed, direct the digital video recorder to:
 generate a program information display that includes a description of a selected program, at least a portion of the selected program being scheduled for broadcast during the first time duration; and
 generate a program recording message for display on the program information display, the program recording message indicating that the recording resources are fully allocated for the first time duration.

55. One or more computer-readable media as recited in claim 47, further comprising computer executable instructions that, when executed, direct the digital video recorder to generate a program recording conflict resolution guide that displays each program scheduled to be recorded over the first time duration in which one or more of the programs scheduled to be recorded create a scheduling conflict due to the recording resources being fully-allocated for program recording during the first time duration.

* * * * *